United States Patent
Stonger

Patent Number: 6,059,729
Date of Patent: May 9, 2000

[54] METHOD AND APPARATUS FOR EDGE ENHANCEMENT IN ULTRASOUND IMAGING

[76] Inventor: Kelly A. Stonger, S38 W30420 Wern Way, Waukesha, Wis. 53189

[21] Appl. No.: 09/175,120

[22] Filed: Oct. 19, 1998

[51] Int. Cl.⁷ ........................................................ A61B 8/00
[52] U.S. Cl. .......................... 600/443; 600/447; 600/458; 382/128
[58] Field of Search ...................... 600/443, 447, 600/458; 382/22, 27, 52, 54, 128; 364/724.05, 724.12; 358/455–459, 465

[56] References Cited

U.S. PATENT DOCUMENTS

| | | | |
|---|---|---|---|
| 5,148,809 | 9/1992 | Biegeleisen-Knight et al. | 600/443 |
| 5,492,125 | 2/1996 | Kim et al. | 600/443 |
| 5,588,435 | 12/1996 | Weng et al. | 600/443 |
| 5,594,807 | 1/1997 | Liu | 382/128 |
| 5,954,653 | 9/1999 | Hatfield et al. | 600/443 |

*Primary Examiner*—Marvin M. Lateef
*Assistant Examiner*—Ali M. Imam
*Attorney, Agent, or Firm*—Dennis M. Flaherty; Christian G. Cabou; Phyllis Y. Price

[57] ABSTRACT

A method and an apparatus for enhancing edges in computer-generated images. Each image frame is divided into non-overlapping blocks of pixels. Each block is characterized by a value proportional to the contrast of the block. Each block is checked to see if its contrast is greater than a user-selectable contrast threshold. If the block contrast is greater than the threshold, a window level operation is performed upon that pixel block. This method restricts the window level edge enhancement function to just the set of pixel blocks that have a high contrast value and may contain an edge.

19 Claims, 3 Drawing Sheets

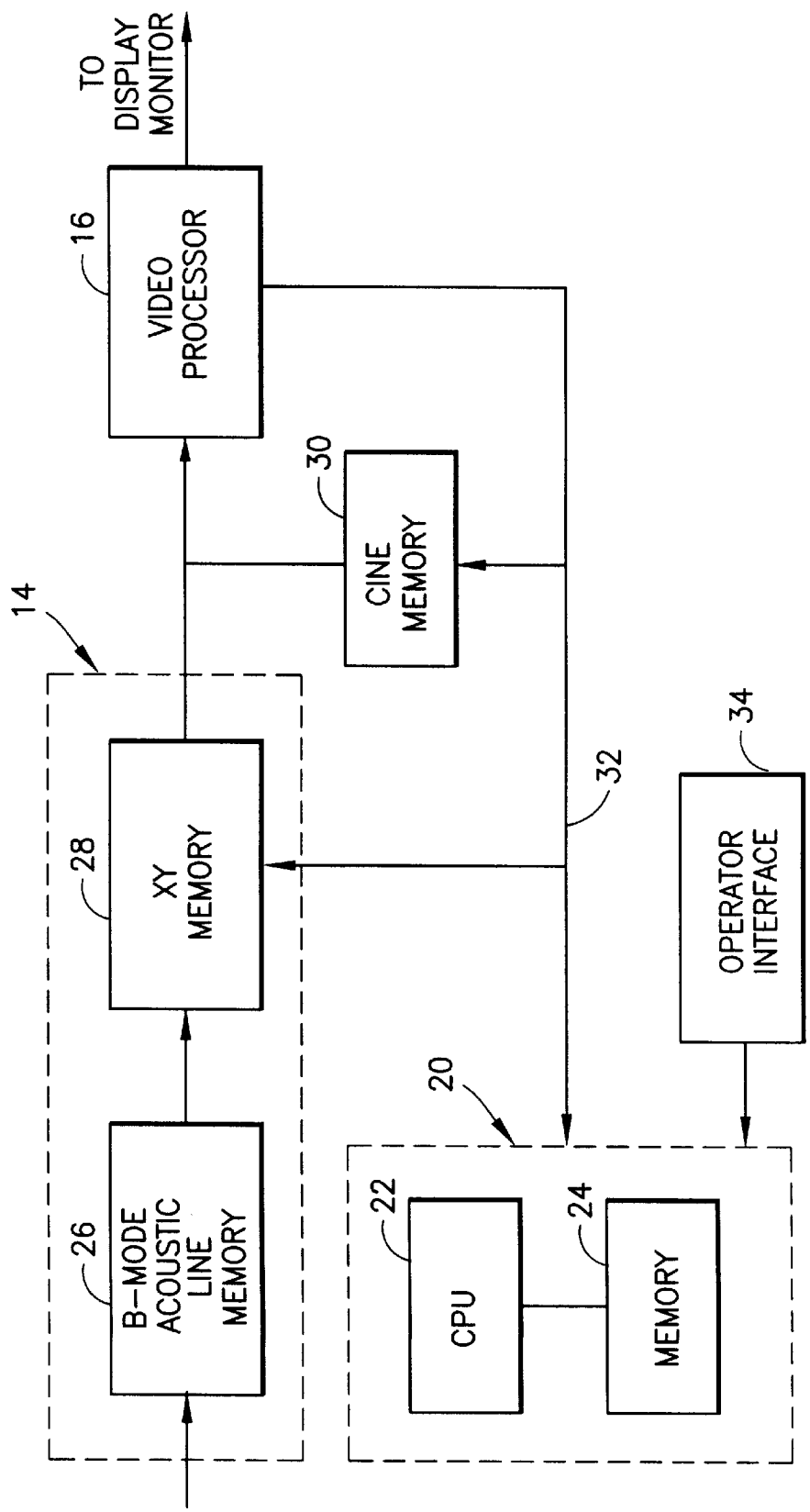

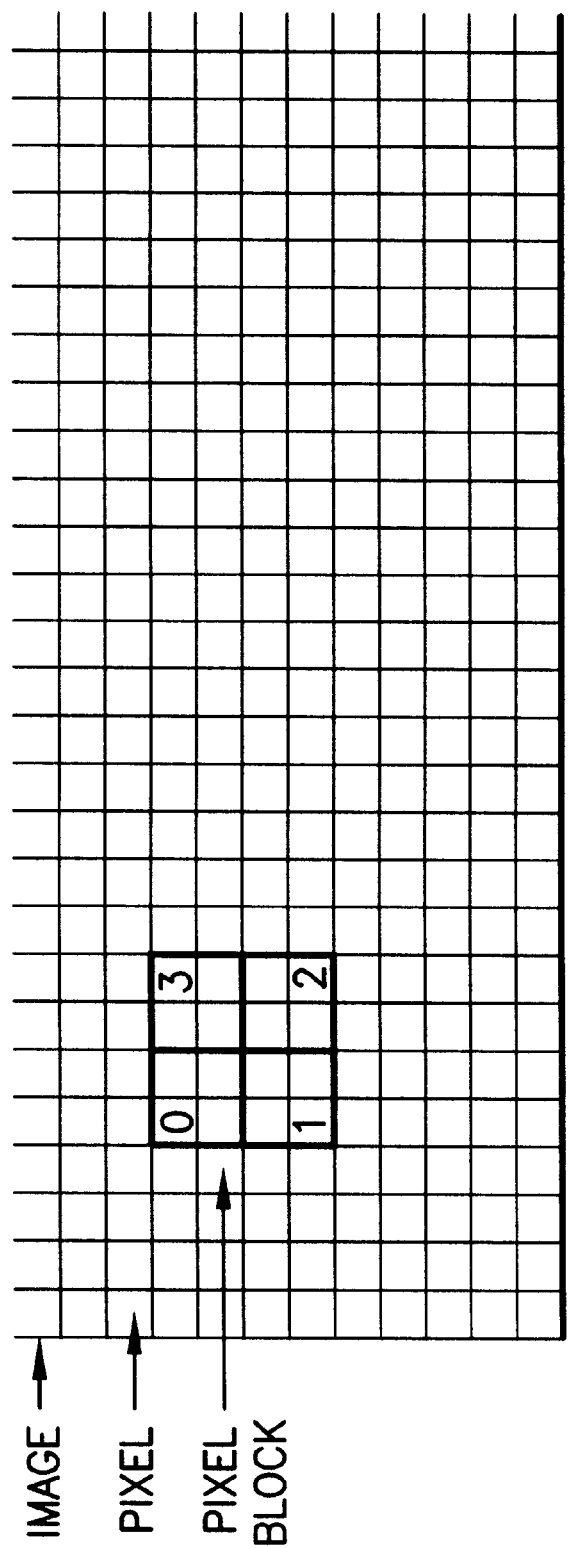

METHOD AND APPARATUS FOR EDGE ENHANCEMENT IN ULTRASOUND IMAGING

FIELD OF THE INVENTION

This invention generally relates to methods for improving the contrast resolution of an image displayed on a video monitor. In particular, the invention relates to methods for enhancing edges in images of the human body displayed on an ultrasound imaging system.

BACKGROUND OF THE INVENTION

Conventional ultrasound scanners create two-dimensional B-mode images of tissue in which the brightness of a pixel is based on the intensity of the echo return. Alternatively, in a color flow imaging mode, the movement of fluid (e.g., blood) or tissue can be imaged. Measurement of blood flow in the heart and vessels using the Doppler effect is well known. The phase shift of backscattered ultrasound waves may be used to measure the velocity of the backscatterers from tissue or blood. The Doppler shift may be displayed using different colors to represent speed and direction of flow. In power Doppler imaging, the power contained in the returned Doppler signal is displayed.

Conventional ultrasound imaging systems comprise an array of ultrasonic transducer elements which are used to transmit an ultrasound beam and then receive the reflected beam from the object being studied. Such scanning comprises a series of measurements in which the focused ultrasonic wave is transmitted, the system switches to receive mode after a short time interval, and the reflected ultrasonic wave is received, beamformed and processed for display. Typically, transmission and reception are focused in the same direction during each measurement to acquire data from a series of points along an acoustic beam or scan line. The receiver is dynamically focused at a succession of ranges along the scan line as the reflected ultrasonic waves are received.

For ultrasound imaging, the array typically has a multiplicity of transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. In the case of a steered array, by changing the time delays and amplitudes of the applied voltages, the beam with its focal point can be moved in a plane to scan the object. In the case of a linear array, a focused beam directed normal to the array is scanned across the object by translating the aperture across the array from one firing to the next.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer element.

An ultrasound image is composed of multiple image scan lines. A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. A scan line's resolution is a result of the directivity of the associated transmit and receive beam pair.

The outputs of the beamformer channels are coherently summed to form a respective pixel intensity value for each sample volume in the object region or volume of interest. These pixel intensity values are post-detection image processed, scan-converted and then displayed as an image of the anatomy being scanned.

Post-detection image processing generally consists of dynamic range (logarithmic) compression, a low pass filter and an edge enhancement filter. While these may be arranged in different orders on different scanners, they are usually done in a sequential manner. Traditionally the low pass filter is designed to prevent aliasing before data downsampling, but it can also play the role of speckle reduction in a wideband imaging system. The edge enhancement filter is usually a high pass filter that acts on the log-compressed data.

Detected images of real anatomy usually contain both large reflected signals (from edges) and low amplitude speckle (from soft tissue). Therefore, if the low pass filter and high pass filter simply perform their tasks blindly, there is always a tendency for these filters to smear out edges and enhance background speckle respectively. With a sequential processing configuration, it is very difficult to keep the low pass and high pass filters from acting on the wrong features. The best that can often be achieved is a compromise between speckle smoothing and edge enhancement.

Thus, there is a need for technique by which the edges in an ultrasound image can be enhanced.

SUMMARY OF THE INVENTION

The present invention is a method for enhancing edges in computer-generated images. Each image frame is divided into non-overlapping blocks of pixels. Each block is characterized by a value proportional to the contrast of the block. Each block is checked to see if its contrast is greater than a user-selectable contrast threshold. If the block contrast is greater than the threshold, a window level operation is performed upon that pixel block. This method restricts the window level edge enhancement function to just the set of pixel blocks that have a high contrast value and may contain an edge. The method of the invention has particular application to the display of ultrasound images and is independent of block size and geometry.

The invention also encompasses an apparatus for enhancing edges in computer-generated images. In particular, the invention includes both a computer programmed to perform edge enhancement of an ultrasound image and an ultrasound imaging system incorporating such a programmed computer.

BRIEF DESCRIPTION OF THE DRAWINGS

FIG. 2 is a block diagram showing the back end of the ultrasound imaging system shown in FIG. 1, with the addition of a host computer programmed to coordinate operation of the subsystems shown in FIG. 1.

FIG. 3 is a diagram showing a pixel image divided into a set of 4×4 pixel blocks.

DETAILED DESCRIPTION OF THE PREFERRED EMBODIMENTS

Figure 1:
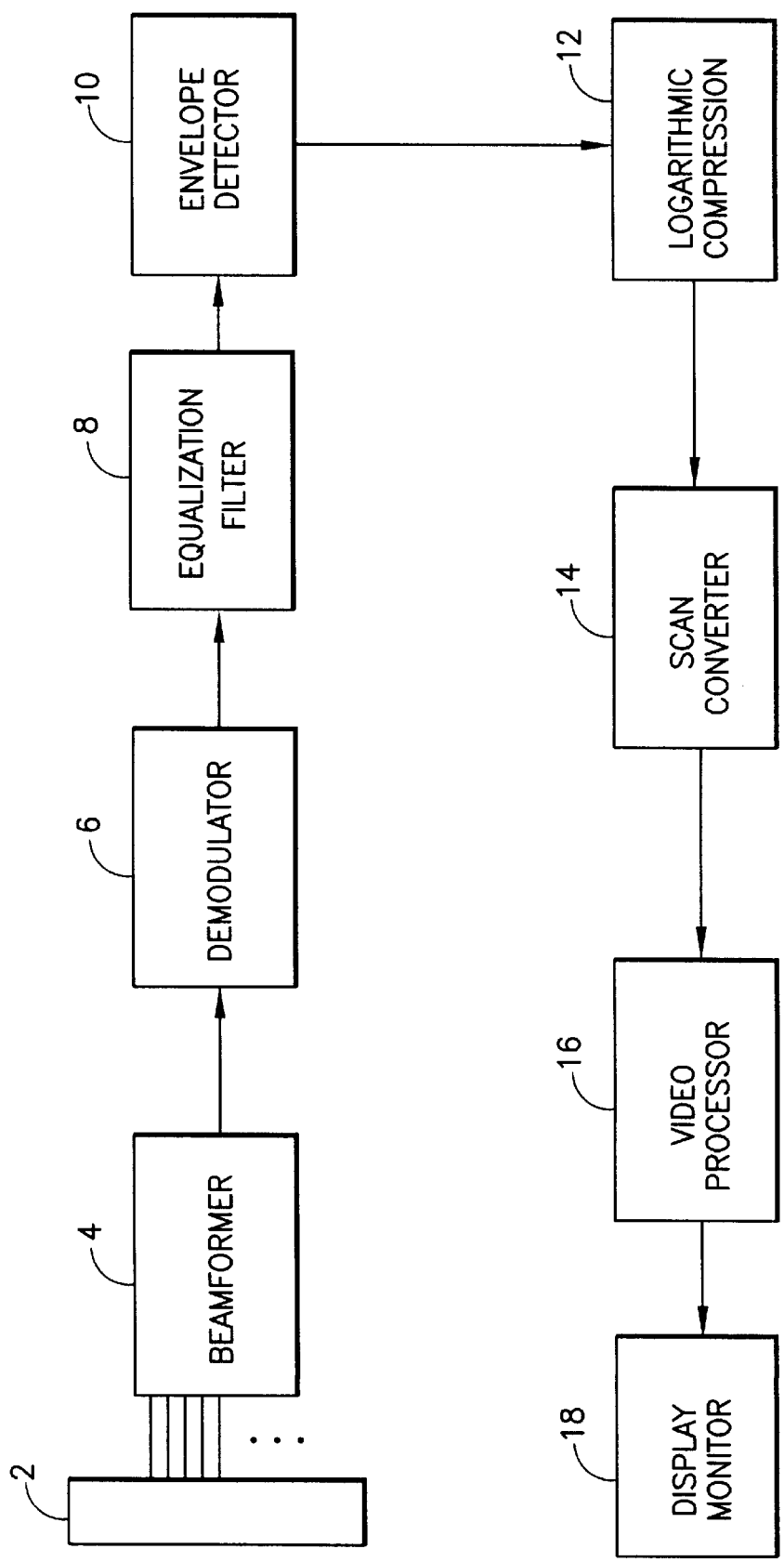
FIG. 1 is a block diagram showing the B-mode signal processing chain for one type of ultrasound imaging system in which the present invention can be incorporated.

One type of ultrasound imaging system in which the present invention can be incorporated is shown in FIG. 1. An ultrasound transducer array 2 is activated to transmit a beam of ultrasound which is focused at a transmit focal position. The transmit beam propagates through the object being scanned and is reflected by ultrasound scatterers in the object.

After each transmit firing, the echo signals detected by the transducer array elements are fed to respective receive channels of the beamformer 4. The receive beamformer tracks echoes under the direction of a master controller (not shown in FIG. 1). The receive beamformer imparts the proper receive focus time delays to the received echo signal and sums them to provide an echo signal which accurately indicates the total ultrasonic energy reflected from a succession of ranges corresponding to a particular transmit focal position.

In one conventional system, the frequencies of the beamformer outputs are shifted to baseband by a demodulator 6. One way of achieving this is to multiply the input RF signal by a complex sinusoidal $e^{i2\pi f_d t}$, where $f_d$ is the frequency shift required. The beamsummed and demodulated signal is then bandpass filtered by an equalization filter 8 which is programmed with a set of filter coefficients to pass a band of frequencies centered at the fundamental frequency $f_0$ of the transmit waveform.

The I/Q components are then sent to a B-mode processor which incorporates an envelope detector 10 for forming the envelope of the beamsummed receive signal by computing the quantity $(I^2+Q^2)^{1/2}$. The envelope of the signal undergoes some additional B-mode processing, such as logarithmic compression (block 12 in FIG. 1), to form display data which is output to a scan converter 14.

In general, the display data is converted by the scan converter 14 into X-Y format for video display. The scan-converted frames are passed to a video processor 16, which maps the video data to a gray scale or mapping for video display. The gray scale image frames are then sent to the video monitor 18 for display. The images displayed by the video monitor 18 are produced from an image frame of data in which each datum indicates the intensity or brightness of a respective pixel in the display. An image frame may, e.g., comprise a 256×256 data array in which each intensity datum is an 8-bit binary number that indicates pixel brightness. The brightness of each pixel on the display monitor 18 is continuously refreshed by reading the value of its corresponding element in the data array in a well-known manner. Each pixel has an intensity value which is a function of the backscatter cross section of a respective sample volume in response to interrogating ultrasonic pulses and the gray map employed.

In another conventional system, the RF signals are summed, equalized and envelope detected without intervening demodulation to baseband. To depict such a system, it is only necessary to remove block 6 from FIG. 1 and connect the output of the beamformer 4 to the input of the equalization filter 8. It should be appreciated that the invention can be employed in both RF and baseband systems.

Referring to FIG. 2, system control is centered in the host computer 20, which accepts operator inputs through an operator interface 34 and in turn controls the various subsystems. The host computer also generates the system timing and control signals. The host computer 20 comprises a central processing unit (CPU) 22 and a random access memory 24. The CPU 22 is programmed to control the time delays applied by the transmit and receive beamformers, the gain applied by the time-gain control amplifiers in the receive beamformer, and the mapping applied by the video processor. The CPU also performs the edge enhancement process of the present invention, as described in more detail below.

The scan converter 14 comprises a B-mode acoustic line memory 26 for scan converting B-mode data and an XY memory 28 for storing each frame of scan-converted data in a respective one of a bank of frame memories. The data stored in the acoustic line memory 26 is transformed to appropriately scaled Cartesian coordinate pixel display data.

In the B mode, the monitor images the time-varying amplitude of the envelope of the signal as a gray scale, i.e., the brightness of a pixel is based on the intensity of the echo return. Each image frame from the XY memory 28 is passed to the video processor 16, which maps the B-mode data to a gray map for video display.

Successive frames of B-mode data are stored in a cine memory 30 on a first-in, first out basis. Storage can be continuous or as a result of an external trigger event. The cine memory 30 is like a circular image buffer that runs in the background, capturing image data that is displayed in real time to the user. When the user freezes the system, the user has the capability to view image data previously captured in cine memory.

The CPU 22 controls the XY memory 28 and the cine memory 30 via the system control bus 32. In particular, CPU 22 controls the flow of data from XY memory 28 to video processor 16 and to cine memory 30, and from cine memory 30 to video processor 16 and to CPU 22 itself. Each frame of pixel data, representing one of a multiplicity of scans or slices through the object being examined, is stored in the XY memory 28 and in the next cycle is transmitted to video processor 16 and to cine memory 30. A stack of frames, representing the scanned object volume, is stored in cine memory 36.

The method of the invention is either applied in real-time to successive frames of pixel data stored in the XY memory 28 or applied (not in real-time) to selected frames of pixel data stored in the cine memory 30. In either case, the pixel data is retrieved from the respective memory by the host computer and enhanced by application of an edge enhancement algorithm. The pixel data set representing the edge-enhanced image frame is then returned to memory from where the pixel data had been retrieved.

In accordance with the preferred embodiment of the invention, an image frame of pixel data is divided into non-overlapping 4 pixel by 4 pixel blocks as shown in FIG. 3. Each block is characterized by a value proportional to the contrast of the block. The contrast of each 4 pixel by 4 pixel block is determined by computing the variance of the pixel values $p_{xy}$ as follows:

$$C = \frac{1}{15}\left(\sum_{y=1}^{4}\sum_{x=1}^{4} p_{xy}^2 - \frac{1}{16}\left(\sum_{y=1}^{4}\sum_{x=1}^{4} p_{xy}\right)^2\right) \quad (1)$$

where C denotes block contrast. To compute a value proportional to the contrast, the division by 15 is eliminated. The steps of dividing the image frame into blocks and computing the variance of the pixel values in each block are performed by the host computer 20. The host computer then checks whether the contrast for a given block is greater than a user-selectable contrast threshold, which is input via the operator interface 34 (see FIG. 2). If the block contrast exceeds the contrast threshold, the host computer performs a window level operation upon that pixel block. This technique restricts the window level edge enhancement function to only the set of pixel blocks that have a high contrast value and may contain an edge.

A window level operation is a standard transformation that is applied to a gray-scale image on a pixel-by-pixel basis that will increase the contrast of the image, and is used to enhance the detection of details. In accordance with this window level operation, a user-selectable pixel value L is used as the level value, and another user-selectable value $W_{offset}$ is used as the window offset. Again these user-selectable values are input via the operator interface 34. Adding the window offset to the level value gives the high window value $W_{high}$:

$$W_{high} = L + W_{offset} \quad (2)$$

whereas subtracting the window offset from the level value gives the low window value $W_{low}$:

$$W_{low} = L - W_{offset} \quad (3)$$

Any pixel $p_{xy}$ with a value less than the low window value $W_{low}$ is set to black and any pixel $p_{xy}$ with a value greater than the high window value $W_{high}$ is set to white. Any pixel $p_{xy}$ with a value within the window (i.e., $W_{low} < p_{xy} < W_{high}$) will be linearly scaled in accordance with the equation:

$$p_{xy,scaled} = (p_{xy} - W_{low}) \times \frac{P_{max}}{W_{high} - W_{low}} \quad (4)$$

where $p_{xy,scaled}$ is the scaled pixel value, $P_{max}$ is the maximum pixel value and $(W_{high} - W_{low})$ is the window size.

In accordance with the preferred embodiment, each image frame is filtered by the host computer using the window level operation to form an edge-enhanced image frame. This edge-enhanced image frame is returned to the memory from which the unenhanced image frame had been retrieved and then video processed for display on the monitor. The result will be an image in which edges are enhanced.

The foregoing preferred embodiments have been disclosed for the purpose of illustration. Variations and modifications of the concept of the invention will be readily apparent to persons skilled in the art. For example, the invention is not limited to processing 4×4 pixel blocks, but rather can be extended to m×n pixel blocks, where m and n are positive integers>3 and m need not be equal to n. All such variations and modifications are intended to be encompassed by the claims set forth hereinafter.

What is claimed is:

1. An imaging system comprising:

a memory for storing an image frame of pixel values;

an image data processor programmed to perform the steps of:

(a) forming a set of m pixel×n pixel blocks of pixel values from said image frame, where m and n are positive integers>3;

(b) computing a contrast value for each of said blocks of pixel values;

(c) for each block in said image frame having a contrast value greater than a predetermined threshold contrast value, performing a contrast-increasing transformation of the pixel values of said block to provide a respective edge-enhanced block of pixel values; and (d) substituting said edge-enhanced blocks for said respective blocks in said image frame having contrast values greater than said predetermined threshold contrast value to form an edge-enhanced image frame; and a display device comprising a multiplicity of pixels for displaying said edge-enhanced image frame.

2. The imaging system as defined in claim 1, wherein said computing step comprises the step of computing a variance of the pixel values in a block.

3. The imaging system as defined in claim 1, wherein said contrast-increasing transformation comprises a window level operation.

4. The imaging system as defined in claim 3, wherein said window level operation comprises the steps of:

setting any pixel value less than a predetermined lower threshold value to black;

setting any pixel value greater than a predetermined upper threshold value to white; and scaling any pixel value not less than said predetermined lower threshold value and not greater than said predetermined upper threshold value.

5. The imaging system as defined in claim 4, wherein said scaling is linear.

6. The imaging system as defined in claim 1, further comprising:

an ultrasound transducer array comprising a multiplicity of transducer elements;

a transmit beamformer for pulsing selected transducer elements during a series of transmit firings;

a receive beamformer coupled to selected transducer elements of said transducer array for acquiring a respective receive signal subsequent to each transmit firing;

a signal processor programmed to form respective image signals from said receive signals; and a converter for converting said image signals into said image frame of pixel values and storing said image frame in said memory.

7. An imaging system comprising:

a memory for storing an image frame of pixel values;

means for forming a set of m pixel×n pixel blocks of pixel values from said image frame, where m and n are positive integers>3;

means for computing a contrast value for each of said blocks of pixel values;

means for performing a contrast-increasing transformation of the pixel values of each block having a contrast value greater than a predetermined threshold contrast value to provide a respective edge-enhanced block of pixel values;

means for substituting said edge-enhanced blocks for said respective blocks in said image frame having contrast values greater than said predetermined threshold contrast value to form an edge-enhanced image frame; and a display device comprising a multiplicity of pixels for displaying said enhanced image frame.

8. The imaging system as defined in claim 7, wherein said computing means compute a variance of the pixel values in a block.

9. The imaging system as defined in claim 7, wherein said contrast-increasing transformation comprises a window level operation.

10. The imaging system as defined in claim 9, wherein said window level operation comprises the steps of:

setting any pixel value less than a predetermined lower threshold value to black;

setting any pixel value greater than a predetermined upper threshold value to white; and scaling any pixel value not less than said predetermined lower threshold value and not greater than said predetermined upper threshold value.

11. The imaging system as defined in claim 10, wherein said scaling is linear.

12. The imaging system as defined in claim 7, further comprising:

an ultrasound transducer array comprising a multiplicity of transducer elements;

a transmit beamformer for pulsing selected transducer elements during a series of transmit firings;

a receive beamformer coupled to selected transducer elements of said transducer array for acquiring a respective receive signal subsequent to each transmit firing;

a signal processor programmed to form respective image signals from said receive signals; and a converter for converting said image signals into said image frame of pixel values and storing said image frame in said memory.

13. A method for enhancing the edges in an image, comprising the steps of:

storing an image frame of pixel values;

forming a set of m pixel×n pixel blocks of pixel values from said image frame, where m and n are positive integers>3;

computing a contrast value for each of said blocks of pixel values;

for each block in said image frame having a contrast value greater than a predetermined threshold contrast value, performing a contrast-increasing transformation of the pixel values of said block to provide a respective edge-enhanced block of pixel values;

substituting said edge-enhanced blocks for said respective blocks in said image frame having contrast values greater than said predetermined threshold contrast value to form an edge-enhanced image frame; and displaying said edge-enhanced image frame.

14. The method as defined in claim 13, wherein said computing step comprises the step of computing a variance of the pixel values in a block.

15. The method as defined in claim 13, wherein said contrast-increasing transformation comprises a window level operation.

16. The method as defined in claim 15, wherein said window level operation comprises the steps of:

setting any pixel value less than a predetermined lower threshold value to black;

setting any pixel value greater than a predetermined upper threshold value to white; and scaling any pixel value not less than said predetermined lower threshold value and not greater than said predetermined upper threshold value.

17. The method as defined in claim 16, wherein said scaling is linear.

18. An imaging system comprising:

a memory for storing an image frame of pixel values;

an image data processor programmed to transform pixel blocks of said image frame having block contrasts greater than a predetermined contrast threshold into respective edge-enhanced pixel blocks having block contrasts greater than said respective block contrasts of said pixel blocks of said image frame to form an edge-enhanced image frame; and a display device comprising a multiplicity of pixels for displaying said edge-enhanced image frame.

19. The imaging system as defined in claim 18, wherein said transformation comprises a window level operation.

* * * * *